3,110,378
BRAKE SYSTEM
Jack W. Qualman, Birmingham, Mich., assignor to General Motors Corporation, Detroit, Mich., a corporation of Delaware
Filed Apr. 30, 1959, Ser. No. 810,074
16 Claims. (Cl. 192—3)

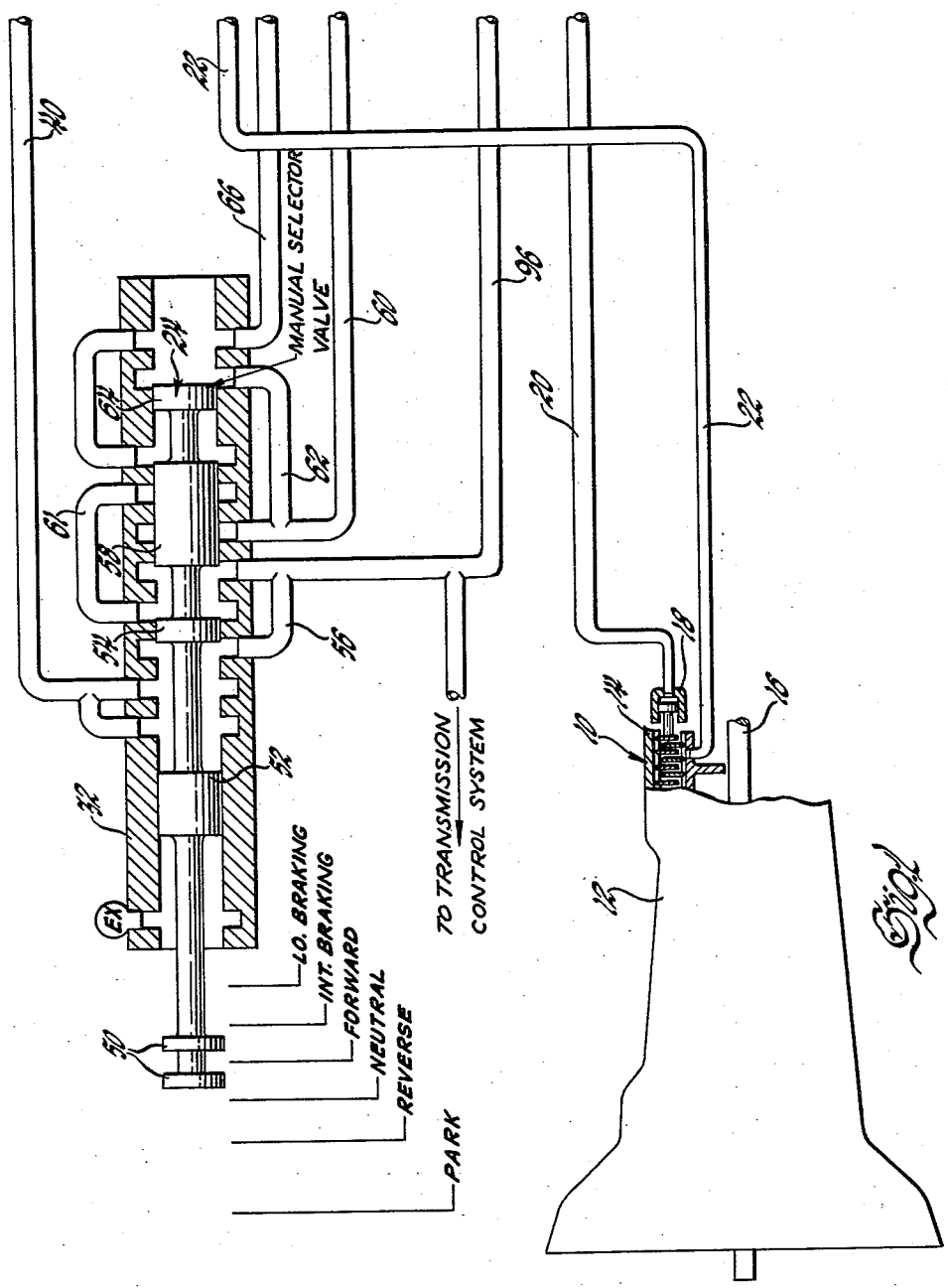

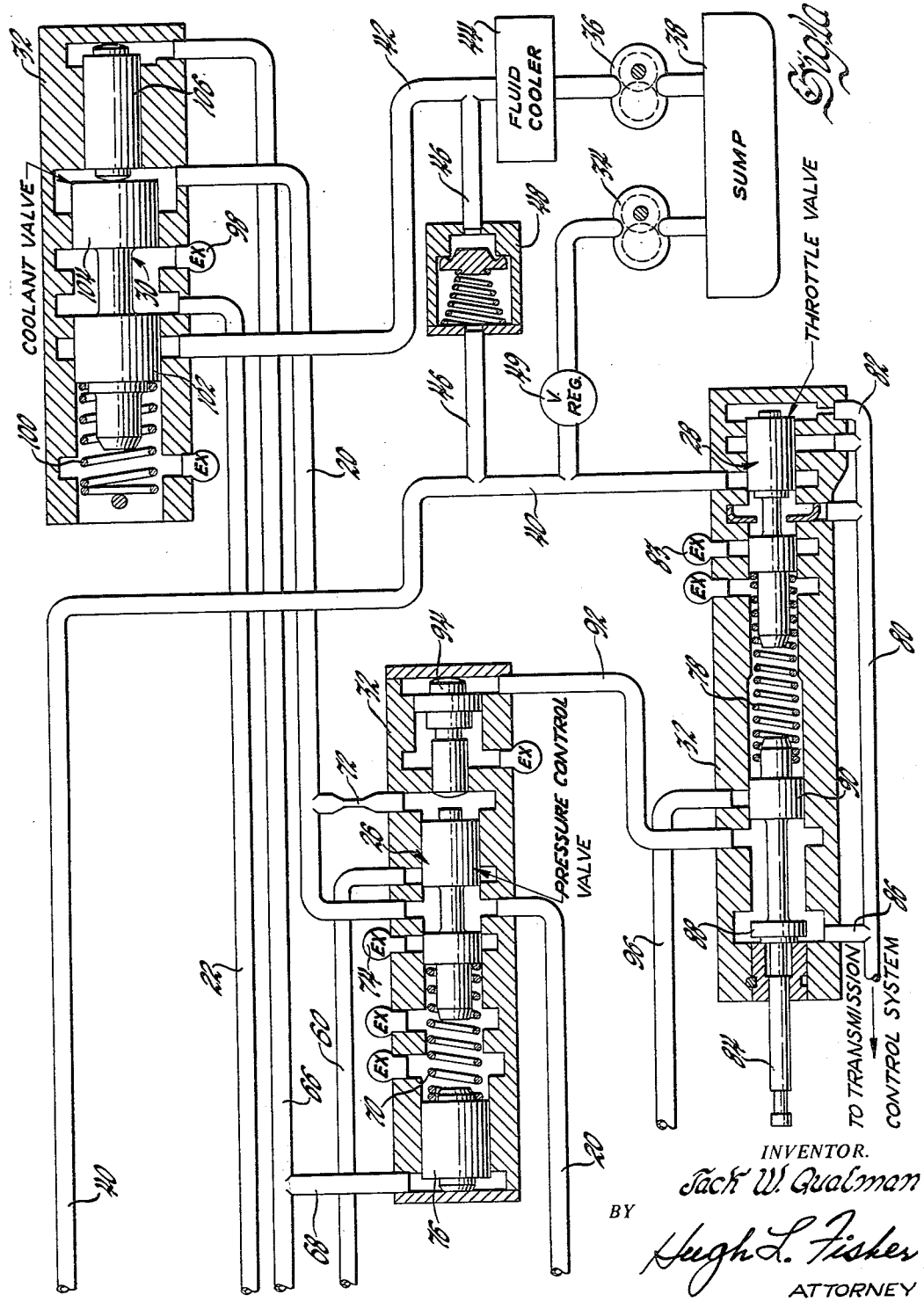

This invention relates generally to brake systems and particularly to brake systems of a character adapted for use, although not exclusively, with motor vehicles.

In general, the various hydrodynamic torque transmitting devices, such as fluid couplings and torque converters utilized in the drive trains for automatic transmissions, are designed for efficient forward drive, i.e., when the drive is from the engine to the wheels. Therefore, when the drive is from the wheels to the engine during coast driving, these devices are inefficient, and the available braking from the engine is lost with a resultant increased burden being placed on the vehicle wheel brakes. For this reason, an extra brake is often necessary to supplement the loss in engine braking.

Of course, any extra brake for this purpose presents problems as to cooling, coordination with the transmission controls, and the adequacy of the supplemental braking resistance, i.e., there should neither be too much nor too little braking resistance, for either extreme renders such a supplemental brake of very limited value. To explain this latter problem further, consideration should be given to the fact that certain occasions require substantial braking such as when descending a steep hill, while others require additional braking but not as much, e.g., when descending a moderately inclined hill. If only one braking resistance is provided, it can be seen that both extremes cannot be satisfactorily met by some compromise. Still another consideration is that on occasion when braking is being utilized, the driver finds it necessary to suddenly accelerate. If the braking resistance continues in effect, this acceleration is probably not possible or there is considerable heat and friction generated that could produce permanent damage to the brake.

With these problems in mind, the invention contemplates the provision of a vehicle brake system that affords plural ranges of braking resistance, that is operated by a unique arrangement of brake controls especially suited for combining with conventional transmission controls, that coordinates brake cooling with the amount of braking resistance, that provides for interrupting the braking action when driving conditions require such, and that affords a novel way of reducing the braking resistance when the driving conditions are so altered as to indicate the need for a reduction.

Specifically, the invention provides a fluid pressure actuated vehicle brake and varies the braking resistance originating therefrom by in turn varying the pressure delivered thereto according to a predetermined scheme. In this manner, both a range of moderate coast braking and a range of substantial coast braking are made available for the operator to choose for meeting different operating conditions.

Related and more specific objectives of the invention include the provision of the foregoing fluid pressure actuated vehicle brake with coolant at one rate in the moderate coast braking range and at a faster rate in the substantial coast braking range and the correlation of the braking in each range with the vehicle throttle so that when the throttle is opened, braking in the moderate braking range is interrupted and braking in the substantial braking range is reduced.

Somewhat more specifically stated, the invention offers a provision for varying the braking capacity with throttle settings.

According to one form of the invention, a vehicle brake is so arranged as to be pressure actuated by a system of brake controls. Pressure for the system is furnished from a suitable source and then distributed by a manually operated selector valve in accordance with the requirements of a moderate range of braking and of a substantial range of braking. In both braking ranges a pressure control valve installed between the selector valve and the vehicle brake is so constructed as to regulate the pressure of the fluid delivered to the brake. In the moderate braking range, the pressure control valve regulates at one stage or level such that the vehicle brake is actuated by a moderate pressure, whereas in the substantial braking range, the pressure control valve operates at a higher level or stage and the resultant pressure is greater for the substantial braking. Coordinated with the pressure control valve is a coolant control valve that in the moderate braking range supplies cooling fluid to the vehicle brake at a relatively slow rate and in the substantial braking range at a relatively fast rate, both adequate for the braking resistances offered.

To prevent damage to the vehicle brake and so as to permit the driver to change from coast to drive, in the event of an emergency with either braking range effective, a throttle valve is utilized so that as soon as the throttle is opened, the pressure control valve regulation is altered. In the moderate braking range the pressure control valve halts further communication between the source and the vehicle brake. Hence, the vehicle brake becomes inoperative. In the substantial braking range, the opening of the throttle causes the pressure control valve to reduce the pressure delivered to the vehicle brake to an amount that will not produce damage to the vehicle brake.

The foregoing and other objects and advantages of the invention will be apparent from the following description and from the accompanying drawings in which:

FIGURES 1 and 1a depict diagrammatically a control system for a vehicle brake illustrated in FIGURE 1.

Referring first to FIGURE 1, the vehicle brake denoted generally by the numeral 10 is shown installed at the rear end of a transmission 12. The vehicle brake 10 is preferably of a multi-disk type and is interposed between a casing 14 for the transmission 12 and an output shaft 16 appropriately connected to the vehicle wheels (not shown). Other type brakes may be utilized for resisting rotation of the transmission output shaft 16 in varying degrees so as to impede or brake vehicle movement as will be apparent to those versed in the art. The brake 10 is pressure actuated by a servomotor 18 with pressure being delivered thereto by a brake apply pressure supply line 20. Also, the disks of the brake 10 are furnished with cooling fluid both for cooling and lubrication purposes by a coolant supply line 22.

Both the fluid pressure in the apply pressure supply line 20 and the cooling fluid in the coolant supply line 22 are furnished by a control system that comprises a manual selector valve 24, a pressure control valve 26, a throttle valve 28, and a coolant control valve 30, all slidable within bores in a valve body 32. The operation of the control system and the valving therein is such that the vehicle brake 10 will provide two ranges of braking. One, an intermediate braking range, affords moderate braking resistances, and the other, a low braking range, provides substantial braking resistances.

Fluid pressure for the control system is derived from both a front pump 34 driven at a speed proportional to engine speed and a rear pump 36 revolved at a speed proportional to vehicle speed. Consequently, the front pump 34 is effective as soon as the vehicle engine is started and the rear pump 36 when vehicle movement commences. Both of the pumps 34 and 36 when operating draw fluid from a sump 38 and deliver this fluid under pressure respectively to a main supply line 40 and a rear pump discharge line 42. A suitable fluid cooler 44 is situated in the rear pump discharge line 42 so as to cool fluid transferred therethrough. Communication between lines 40 and 42 is via an interconnecting line 46 and the quantity of fluid pressure contributed by the rear pump 36 is determined by the check valve 48 that may be set to open at any desired value. Also, the check valve 48 prevents the fluid pressure in the main supply line 40 from being exhausted through the rear pump 36 or from producing an undesired back pressure in the rear pump discharge line 42. The pressure within the main supply line 40 is determined by a suitable pressure regulating valve 49 arranged to operate in a known manner.

The fluid pressure in the main supply line 40 is distributed by a manual selector valve 24 in accordance with the requirements of the range of operation selected by the driver. To maneuver the selector valve 24, spaced flanges 50 at the left terminal end thereof are furnished and a bifurcated lever or other suitable agency may be installed therebetween so as to be actuated through linkage, cables, or the equivalent, by a manually operated control within the driver compartment of the vehicle. Since this invention concerns primarily the intermediate and low braking range settings, only these settings of the selector valve 24 will be discussed in detail. The other settings indicated by the legends Park, Reverse, Neutral, and Forward cause the transmission 12 to be conditioned for operation in any appropriate way.

In the intermediate braking range setting of the selector valve 24, the fluid pressure in the main supply line 40 at the pressure determined by the pressure regulator valve 49 is transferred between the valve lands 52 and 54, through a cross-passage 56 between valve lands 54 and 58 and to an intermediate braking range supply line 60 extending to the pressure control valve 26. When the selector valve 24 is moved one step further to the right and to the low braking range setting, the fluid pressure within the main supply line 40 is transferred between the valve lands 52 and 54, through a cross-passage 61, between the valve lands 54 and 58, and then both to the intermediate braking range supply line 60 and a branch 62 thereof. In the intermediate braking range setting, flow in the branch 62 was blocked by the valve lands 58 and 64. From the branch 62, this fluid pressure proceeds between valve lands 58 and 64 and to a low braking range supply line 66 extending to the coolant control valve 30. A branch 68 of the low braking range supply line 66 also delivers this fluid pressure to the pressure control valve 26 for reasons to become more apparent.

To explain the operation of the pressure control valve 26, the pressure level or stage of regulation occurring in the intermediate braking range will first be considered. In this intermediate braking range, the fluid pressure delivered to the pressure control valve 26 by the intermediate braking range supply line 60 will pass through the valve 26 and to the brake apply pressure supply line 20 inasmuch as a restoring spring 70 will hold the valve 26 in the open position, which corresponds to the rightmost position of the valve 26. The brake apply pressure in supply line 20 will proceed through a restricted branch 72 thereof to the right end of the control valve 26 and if sufficient, will move the valve 26 to the left and the closed position in which communication is established between an exhaust port 74 and supply line 20, thus relieving the pressure in the supply line 20 sufficiently for the restoring spring 70 to again move the control valve 26 back to the open position. This regulating action is well known and will continue with the pressure developed being at a stage or level determined by the bias from the restoring spring 70. Actually, this regulated pressure will be a predetermined amount less than the main line pressure delivered by the intermediate braking range supply line 60.

When the selector valve 24 is in the low braking range setting, in addition to the fluid pressure in the intermediate braking range supply line 60, there is also the same fluid pressure delivered by the low braking range supply line 66 and the branch 68 thereof to the left end of a low braking range plug valve 76 positioned in the control valve bore at the left side thereof. This pressure in branch 68 when acting on the end area of the plug valve 76 will add to the bias of the spring 70 and transfer therethrough to the control valve 26 an additional force such that the control valve 26 will commence to regulate at a higher level or stage and produce, due to the same regulating action, an increased brake apply pressure in the supply line 20 so as to cause the servomotor 18 to engage the vehicle brake 10 with a greater force and thereby increase the braking resistance. When the selector valve 24 is returned to the intermediate braking range setting, the pressure control valve 26 will regulate at the lower level and the resultant reduced brake apply pressure will decrease the braking resistance a proportionate amount.

Because it may be necessary to suddenly change from coast driving when the vehicle brake 10 is effective to forward driving, provision is made for advising the pressure control valve 26 of this change. To explain this need further, it is possible that either of the braking ranges is being utilized to retard the vehicle and that suddenly it is necessary to accelerate. Therefore, to make this possible without interference from the brake 10, and to prevent damage to the brake 10, the change in the driver's desires is recognized by the pressure control valve 26 through the utilization of the throttle valve 28. The throttle valve 28 is of the type generally utilized for controlling the shift points in a transmission. In this instance, the throttle valve 28 upon commencement of regulation is urged to the open position by a spring 78 so that fluid pressure from the main supply line 40 is transferred to a throttle pressure supply line 80. The pressure in supply line 80 is then transferred via a restricted branch 82 thereof to the right end of the valve 28 and when adequate, in the same way as with the pressure control valve 26, will shift the throttle valve 28 to the left and the closed position until an exhaust port 83 is opened so as to reduce the pressure enough for the spring 78 to again move the valve 28 to the open position. This regulating action is the same as that of the pressure control valve 26 and will continue developing a pressure in accordance with the bias from the spring 78.

To render the pressure in the supply line 80 throttle conscious, the bias from the spring 78 is supplemented through an accelerator pedal actuated member 84. Consequently, as the accelerator pedal is depressed, the member 84 will increase the bias from the spring 78, and accordingly the pressure developed by the throttle valve 28 will increase in proportion to these increased throttle openings.

The throttle pressure in the supply line 80 is transferred by a branch 86 thereof between the valve lands 88 and 90 on the accelerator pedal actuated member 84 when in the depicted position to a line 92 extending to the right end of a plug valve 94 in the right side of the bore for the pressure control valve 26 and will urge the pressure control valve 26 in a pressure decreasing direction. Therefore, during initial throttle openings, the corresponding throttle pressure is allowed by the land 88 to communicate with the control valve 26 so that the pressure developed by the control valve 26 will decrease in inverse proportion to the throttle pressure, or in other words, will decrease as throttle pressure increases.

When the throttle is opened a predetermined extent, the land 88 on the accelerator pedal actuated member 84 will interrupt communication between the throttle pressure supply branch line 86 and line 92 and land 90 will permit communication between a forward drive supply line 96 extending from the selector valve 24 and the line 92.

As a result, main line pressure from the forward drive supply line will then act on the plug valve 94. Now, if the control valve 26 is regulating at the lower level in the intermediate braking range, the main line pressure acting on the plug valve 94 will be sufficient to move the control valve 26 to the depicted closed position whereupon the supply of apply pressure via supply line 20 to the brake servomotor 18 will be cut off and the brake 10 rendered ineffective. On the other hand, if the pressure control valve 26 is regulating at the higher level in the low braking range, the main line pressure acting on the plug valve 94 will not be adequate in the preferred embodiment to overcome entirely the main line pressure acting on the low braking range plug valve 76. Consequently, the pressure developed by the control valve 26 will be reduced sufficiently so as to prevent damage to the vehicle brake 10 while allowing the vehicle to be accelerated temporarily.

Because more cooling fluid is required by the brake 10 when operating in the low braking range than in the intermediate braking range, the supply thereto is altered accordingly. Hence, waste of cooling fluid is avoided, and there is no need to furnish some compromise amount of cooling fluid so as to reduce waste. To do this, the coolant control valve 30 is moved by brake apply pressure delivered thereto by supply line 20 from the viewed position in which the coolant supply line 22 is connected to an exhaust port 98 to a partially open position against a bias from a spring 100. In the partially open position, the valve lands 102 and 104 are so situated that the land 102 only permits partial communication between the rear pump discharge line 42 and the coolant supply line 22. In this way, the amount or quantity of cooling fluid delivered to the vehicle brake 10 is restricted but is adequate for the moderate braking resistances offered in the intermediate braking range. When the selector valve 24 is moved to the low braking range, the fluid pressure in the low braking range supply line 66 acting on the right end of plug valve 106 and the resultant increased brake apply pressure acting on the right end of the coolant control valve 30 will combine to cause the coolant control valve 30 to be moved further to the left and to the fully open position so that now a maximum quantity of cooling fluid is delivered to the vehicle brake 10 for carrying away heat generated by the substantial braking resistance afforded.

To summarize the operation of the vehicle brake 10 and the control system therefor, the selector valve 24 is assumed to be situated in the intermediate braking range setting and the vehicle is assumed to be coasting forwardly with the wheels driving. In this setting of the selector valve 24, the pressure control valve 26 will deliver a regulated brake apply pressure to the brake servomotor 18 via supply line 20 adequate for the vehicle brake 10 to provide a moderate braking resistance to rotation of the output shaft 16 by the wheels. Simultaneously, the coolant control valve 30 is moved to the partially open position and a limited but adequate amount of cooling fluid is supplied to the vehicle brake friction surfaces by the coolant supply line 22. If the driver depresses the accelerator pedal, the accelerator pedal actuated member 84 will initially cause the brake apply pressure to be reduced and then will be positioned upon further movement so that line pressure is transferred from the forward drive supply line 96 to the line 92 and the pressure control valve 26 will be forced to the closed position demonstrated. This interrupts the braking action of the vehicle brake 10, and the vehicle will proceed forwardly without any interference therefrom.

Next, it is assumed that the manual selector valve 24 is moved to the low braking range setting, whereupon the pressure control valve 26 will commence to regulate at the higher level and furnish to the brake servomotor 18 an increased brake apply pressure. This increases the braking resistance from the vehicle brake 10 so as to provide for instances where extreme braking is needed. Also, at the same time this increased brake apply pressure will combine with the main line pressure delivered via the low braking range supply line 66 to move the coolant control valve 30 to the fully open position, and a maximum quantity of cooling fluid will be supplied thereby for cooling the vehicle brake 10. Again, if the driver desires for some reason to propel the vehicle forwardly, and in doing this depresses the accelerator pedal, the pressure control valve 26 will be urged to the left in a decreasing pressure direction by the pressure acting on the plug valve 94 in opposition to the combination of pressure acting on the low braking range plug valve 76 and the bias from spring 70. The resultant decrease in brake apply pressure will reduce the braking resistance of the vehicle brake 10 sufficiently to permit forward propelling of the vehicle relatively unimpeded for an interval of need. As in the intermediate braking range, the pressure acting on the plug valve 94 initially increases with throttle opening and then becomes equivalent to main line pressure. The interval that this pressure acting on the plug valve 94 is throttle responsive of course can be varied or entirely eliminated if desired simply by altering the permitted communication between lines 86 and 92.

From the foregoing, it can be seen that with this brake arrangement, two ranges of braking are offered adequate to cover all extreme situations encountered where braking is needed and that provision is made for altering the braking capacity if it suddenly becomes necessary to recommence driving the vehicle with the engine. During both ranges of braking, the vehicle brake 10 is cooled properly but without any waste of cooling fluid and without the need for any compromise between the cooling requirements of each braking range.

The invention is to be limited only by the following claims.

I claim:
1. In combination, a fluid pressure actuated brake, a source of pressure fluid, pressure control means for regulating the pressure of the fluid supplied by the source for actuating the brake, and cooling fluid supply means so arranged as to be rendered effective to furnish cooling fluid to the brake when the actuating pressure delivered to the brake is of a predetermined value.

2. In combination, a fluid pressure actuated brake, a source of pressure fluid, pressure control means for regulating the pressure of the fluid supplied by the source for actuating the brake, means coacting with the pressure control means so as to vary the braking capacity of the brake, and cooling fluid supply means so arranged as to be rendered effective to furnish cooling fluid to the brake when the actuating pressure delivered to the brake is of a predetermined value.

3. In combination, a fluid pressure actuated brake, a source of pressure fluid, pressure control means for regulating the pressure of the fluid supplied by the source for actuating the brake so as to vary the brake capacity thereof, and cooling fluid supply means for furnishing cooling fluid to the brake, the cooling fluid means including means controlled by the regulated pressure developed by the pressure control means so as to cause cooling fluid to be supplied to the brake in quantities corresponding to the braking resistance.

4. In a motor vehicle having an engine with a throttle control therefor, the combination of a fluid pressure actuated vehicle brake, a source of pressure fluid, pressure control means for controlling the pressure of the fluid supplied by the source for actuating the vehicle brake, means for interrupting the operation of the vehicle brake when the throttle control is in predetermined conditions, and cooling fluid supply means so arranged as to be rendered effective to furnish cooling fluid to the brake when the actuating pressure delivered to the brake is of a predetermined value.

5. In a throttle controlled motor vehicle, the combination of a fluid pressure actuated brake, a source of pressure fluid, pressure control means for regulating the pressure of the fluid supplied by the source for actuating the vehicle brake, means coacting with the pressure control means so as to vary the braking capacity of the vehicle brake and thereby afford plural ranges of braking, cooling fluid supply means so arranged as to be rendered effective to furnish cooling fluid to the vehicle brake when the pressure delivered to the brake is of a predetermined value, and means for interrupting the operation of the vehicle brake when the throttle is opened.

6. In a throttle controlled motor vehicle, the combination of a fluid pressure actuated vehicle brake, a source of pressure fluid, control means for regulating the pressure of the fluid supplied by the source for actuating the vehicle brake, and throttle responsive means coacting with the control means so as to decrease the pressure controlled by the control means and accordingly the braking resistance of the vehicle brake simultaneously as the throttle opening increases.

7. In a motor vehicle having a motor with a throttle, the combination of a fluid pressure actuated vehicle brake, a source of pressure fluid, pressure control means for regulating the pressure of the fluid supplied by the source for actuating the vehicle brake, means coacting with the pressure control means so as to produce different stages of pressure regulation thereby enabling the brake to afford a range of moderate braking during one stage of regulation and a range of substantial braking during another stage of regulation, and means simultaneously reducing the braking resistance of the vehicle brake in one of the ranges of braking as the throttle is opened and the vehicle caused to be propelled by the motor.

8. In a motor vehicle, the combination of a fluid pressure actuated vehicle brake, a source of pressure fluid, pressure control means for regulating the pressure of the fluid supplied by the source for actuating the vehicle brake, means coacting with the pressure control means so as to produce different stages of pressure regulation thereby enabling the brake to afford a range of moderate braking during one stage of regulation and a range of substantial braking during another stage of regulation, and cooling fluid supply means so arranged as to be rendered effective to furnish cooling fluid to the vehicle brake at a relatively slow rate when the moderate braking range is effective and at a relatively fast rate when the substantial braking range is effective.

9. In a motor vehicle having a motor provided with a throttle, the combination of a fluid pressure actuated vehicle brake, a source of pressure fluid, pressure control means for regulating the pressure of the fluid supplied by the source for actuating the vehicle brake, means coacting with the pressure control means so as to produce different stages of pressure regulation thereby enabling the brake to afford a range of moderate braking during one stage of regulation and a range of substantial braking during another stage of regulation, and means for interrupting operation of the vehicle brake when the throttle is in a selected position and vehicle is propelled by the motor in the moderate braking range and for reducing the braking resistance of the vehicle brake in the substantial braking range.

10. In a throttle controlled motor vehicle, the combination of a fluid pressure actuated vehicle brake, a source of pressure fluid, pressure control means for regulating the pressure of the fluid supplied by the source for actuating the vehicle brake, means coacting with the pressure control means so as to produce different stages of pressure regulation thereby enabling the brake to afford a range of moderate braking during one stage of regulation and a range of substantial braking during another stage of regulation, and throttle responsive means for interrupting operation of the vehicle brake in the moderate braking range and for reducing the braking resistance of the vehicle brake in the substantial braking range.

11. In a throttle controlled motor vehicle, the combination of a fluid pressure actuated vehicle brake, a source of pressure fluid, pressure control means for regulating the pressure of the fluid supplied by the source for actuating the vehicle brake, pressure regulation stage establishing means coating with the pressure control means so that the pressure control means produces different stages of pressure regulation thereby enabling the vehicle brake to afford a range of moderate braking during one stage of regulation and a range of substantial braking during another stage of regulation, means supplying cooling fluid to the vehicle brake, the cooling fluid supplying means coacting with the pressure regulation stage establishing means so as to supply cooling fluid to the vehicle brake at a relatively slow rate in the moderate braking range and at a relatively fast rate in the substantial braking range, and throttle responsive means coacting with the pressure control means so that the pressure control means interrupts the supply of pressure fluid to the vehicle brake when the throttle is opened in the moderate braking range and so that the pressure control means reduces the pressure delivered to the vehicle brake when the throttle is opened in the substantial braking range.

12. In a throttle controlled motor vehicle having plural ranges of coast braking, the combination of a fluid pressure actuated vehicle brake, a selector for choosing the braking range to be effective, a source of pressure fluid for actuating the brake, a pressure control valve for regulating the pressure delivered by the source to the brake, the pressure control valve being arranged so as to afford different stages of pressure regulation in each of the plural braking ranges, a coolant control valve coacting with the pressure control valve and arranged to be controlled thereby so as to deliver cooling fluid to said brake at different rates in each of the different stages of regulation, and a throttle valve responsive to throttle settings, the throttle valve coacting with the pressure control valve so that the pressure control valve interrupts fluid communication between the source and the vehicle brake when the throttle is opened in one of the plural braking ranges and so that the pressure control valve reduces the pressure delivered by the source to the brake when the throttle is opened in another of the plural braking ranges.

13. In a throttle controlled motor vehicle having plural ranges of braking, the combination of a fluid pressure actuated vehicle brake, a selector for choosing the braking range to be effective, a source of pressure fluid for actuating the brake, a pressure control valve for regulating the pressure delivered by the source to the brake, and a throttle valve responsive to throttle opening, the throttle valve coacting with the pressure control valve so as to cause the pressure control valve to produce a regulated pressure that decreases simultaneously as the throttle opening increases.

14. In a throttle controlled motor vehicle having moderate and substantial ranges of braking, the combination of a fluid pressure actuated vehicle brake, a selector for choosing the braking range to be effective, a source of pressure fluid for actuating the brake, a pressure control valve for regulating the pressure delivered by the source to the brake, the pressure control valve being arranged so as to afford a reduced pressure stage of regulation in the moderate braking range and an increased pressure stage of regulation in the substantial braking range, and a coolant control valve controlled by the regulated pressure from the pressure control valve and so arranged as to deliver cooling fluid to the brake at a relatively slow rate in the reduced stage of regulation and at a relatively fast rate in the increased pressure stage of regulation.

15. In a throttle controlled motor vehicle having moderate and substantial ranges of braking, the combination of a fluid pressure actuated vehicle brake, a selector for choosing the braking range to be effective, a source of pressure fluid for actuating the brake, a pressure control valve for regulating the pressure delivered by the source to the brake, the pressure control valve being arranged so as to afford a reduced pressure stage of regulation in the moderate braking range and an increased pressure stage of regulation in the substantial braking range, a coolant control valve controlled by the regulated pressure from the pressure control valve and so arranged as to deliver cooling fluid to the brake at a relatively slow rate in the reduced stage of regulation and at a relatively fast rate in the increased pressure stage of regulation, and a throttle valve responsive to throttle settings, the throttle valve coacting with the pressure control valve so that the pressure control valve interrupts fluid communication between the source and the brake when the throttle is opened in the moderate braking range and so that the pressure control valve reduces the pressure delivered to the brake when the throttle is opened in the substantial braking range.

16. In a throttle controlled motor vehicle having moderate and substantial ranges of coast braking, the combination of a vehicle brake, an expansible chamber motor for actuating the brake, a source of pressure fluid, a selector valve between the expansible chamber motor and the source and arranged so as to choose the range of braking to be effective, a pressure control valve between the selector valve and the expansible chamber motor and so arranged as to regulate the pressure of the fluid delivered to the expansible chamber motor, the pressure control valve being in fluid communication with the selector valve so that when the substantial range of braking is effective the pressure control valve regulates at a higher pressure, a coolant control valve controlled by the regulated pressure from the pressure control valve and so arranged as to deliver cooling fluid to the brake at a relatively slow rate in the moderate braking range and at a relatively fast rate when the pressure is increased in the substantial range of braking, and a throttle valve responsive to throttle settings, the throttle valve coacting with the pressure control valve so that the pressure control valve interrupts communication between the source and the expansible chamber motor when the throttle is opened in the moderate braking range and so that the pressure control valve reduces the pressure produced and delivered by the pressure control valve to the expansible chamber motor when the throttle is opened in the substantial braking range.

References Cited in the file of this patent
UNITED STATES PATENTS

| | | |
|---|---|---|
| 1,824,050 | Joers et al. | Sept. 22, 1931 |
| 2,207,041 | Vau | June 9, 1940 |
| 2,329,156 | Coffey | Sept. 7, 1943 |
| 2,523,766 | Kelley | Sept. 26, 1950 |
| 2,758,684 | Stickel | Aug. 14, 1956 |
| 2,832,428 | Kelley et al. | Apr. 29, 1958 |
| 2,926,737 | Fischer | Mar. 1, 1960 |
| 2,968,379 | Kelley | Jan. 17, 1961 |